May 31, 1938.　　　G. A. F. WINCKLER　　　2,118,996

EMERGENCY LAMP

Filed July 25, 1934

Inventor,
Gunnar A. F. Winckler,
by Frank G Hattie
Attorney.

Patented May 31, 1938

2,118,996

UNITED STATES PATENT OFFICE 2,118,996

EMERGENCY LAMP

Gunnar A. F. Winckler, Worcester, Mass., assignor to Winckler Engineering Laboratories Incorporated, Boston, Mass., a corporation of Massachusetts Application July 25, 1934, Serial No. 736,884

2 Claims. (Cl. 136—113)

The invention relates to an electrically lighted emergency lamp having a novel activator and indicator especially adapted for use on vehicles such as trucks when the standard signal lights go out and the following is a specification.

The invention consists of having a battery of lamps in position on a holder to be used when needed and operated by a self-contained generator and starting device which allows the lamp to be put into instant and operative service under emergency conditions by a pounding action which indents the activating member and indicates its condition under emergency service.

The invention further consists of a self-contained electrical generator and starting device so constructed that the generator can be instantly started to furnish electrical current to light the lamp under emergency conditions, and when not in use will not deteriorate so that an infinite shelf-life can be obtained. The lamps when placed in position can remain in the holder until needed for an indefinite period to serve every emergency condition. Heretofore electric generators of this type deteriorate very quickly and have indefinite shelf-life which unfit them for emergency conditions.

The present invention consists of a battery type of generator. The lamp is secured to the top of the casing and the bottom is provided with a cover made of ductile material having a bulbous formation extending downwardly which can be indented by a quick blow and serving as the first function of the generating starting operation. Located inside the casing is a cloth container made in several ply which fits the bottom casing and a glass ball or vitreous container filled with electrolytic fluid is placed in the cloth container and rests in the bulbous formation in the cover. Superimposed on the glass ball or vitreous container having the electrolytic fluid there is a ground carbon positive pole which is connected to the lamp on one side of the circuit, while on the opposite side of the lamp is connected to the negative pole or casing, thus forming a self-contained electrical generator and starting unit.

When the lamp is used the operator dents the ductile material which breaks the glass ball or vitreous container and allows the electrolytic fluid to flow between the poles which start the generator and lights the lamp. When the glass ball or vitreous container is broken the electrolytic fluid saturates the lower part of the ground carbon forming the positive pole and at the same time the electrolytic fluid is drawn up by capillary attraction of the cloth container which allows all the ground carbon to be saturated immediately on the active surface of the pole to furnish power to light the lamp over an extended period of time.

The object of the invention is to provide a self-contained electrical generating unit and starting device that will provide a light when needed under emergency conditions and also provide an infinite shelf-life when the lamp is not in use and indicate whether the cell has been used or ready for emergency work.

Referring to the figures.

Figure 1:
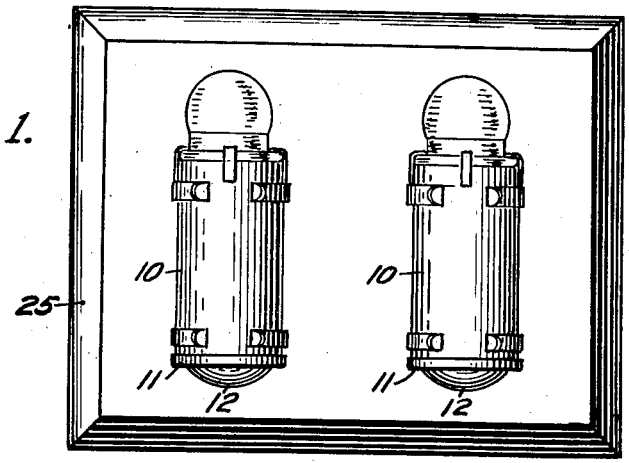
Fig. 1 is a holder with a battery of the generator and lamps in position for emergency use.
Figure 2:
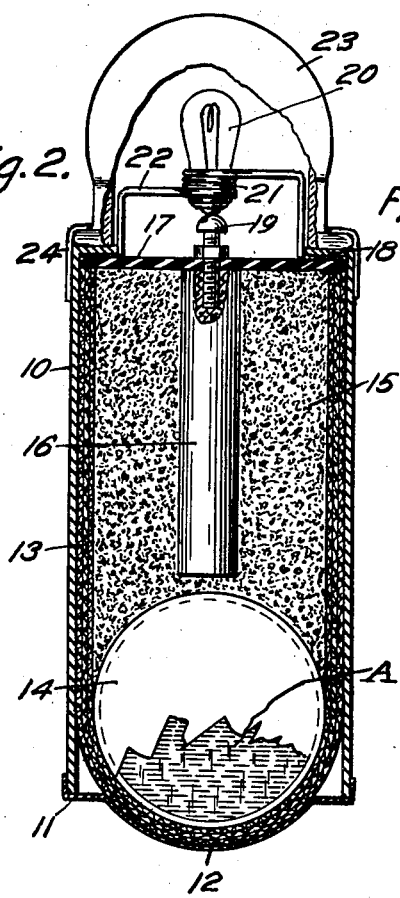
Fig. 2 is a vertical cross-section through the generator showing the lamp and the ball container broken away showing the electrolytic fluid.
Figure 3:
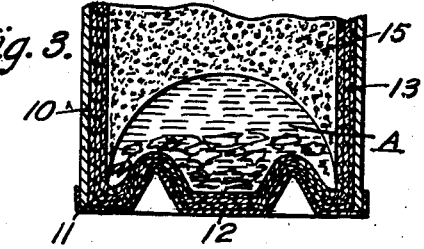
Fig. 3 is a vertical cross-section of the generator after the ductile material has been dented and the container for the electrolytic fluid is broken.
Figure 4:
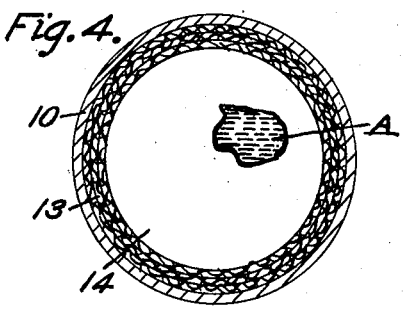
Fig. 4 is a horizontal cross-section through the generator showing the glass ball container.

Referring to the drawing in detail which illustrates the new and novel self-contained generator and starting device for lighting an emergency lamp for vehicles.

The generator is provided with a casing 10 which serves as the negative pole of the generator. The casing 10 is provided with a lower cover 11 having a bulbous formation 12 made of thin ductile material which will indent easily under a direct blow and will break the glass container, but strong enough to withstand common handling.

Fitting closely in the casing 10 is a container 13 made of several ply of cloth which serves to carry the electrolytic fluid to the upper part of the generator by capillary attraction.

Fitting closely to the bottom of the cloth container 13 is a glass ball or vitreous container 14 for holding a reserve supply of electrolytic fluid "A" away from the poles of the generator so they will not deteriorate and assume infinite shelf-life which determines a high class emergency light. The container 13 can be broken by indenting the bulbous cover 12 which will be imparted to the glass container which causes it to be shattered and permits the electrolytic fluid to flow between the poles to generate current to light the lamps and the indentation serving as an actuating means.

Superimposed on the glass ball or vitreous container 13 is the ground carbon 15. During the filling operation of the carbon 15 the carbon rod 16 is placed in position. When the casing is filled sufficiently with carbon the cover 17 is placed in position and the upper edge of the casing 10 is peened over the cover 18 and sealed. The carbon rod 16 is secured to the cover 17 by the screw 19 and held in position by a lock nut. The screw 19 forms the positive pole contact for the lamp 20. The lamp 20 rests in the socket 21 made from wire in helical convolutions which extends into a frame 22 supported on the casing 10 and forms the negative pole for electrical current for the lighting of the lamp. A globe 23 is provided for protecting the lamp and directing the light rays. The globe is fastened to the casing 10 by the clips 24.

For emergency use the lamps are placed on the holder 25 as shown in Fig. 1.

In operation the first thing to be considered is the absolute continuity of shelf-life of the generator so the lamps can be retained in the emergency condition for an indefinite length of time for immediate use.

One of the problems in this type of device is to keep the electrolytic fluid out of contact with the poles of the generator when not in use. This is accomplished by retaining the electrolytic fluid in a glass container which prevents the fluid from saturating the poles and deteriorating them. Thus, by placing the electrolytic fluid in a container resistant to corrosion and local action, the poles are absolutely protected. The novelty of the invention resides in being able to bring the electrolytic fluid into position to generate current in a positive and indicative manner by giving the cover 12 a quick blow which will dent and shatter the glass and allow the electrolytic fluid to saturate the poles by causing the fluid to pass upwardly by capillary attraction of the cloth container 13 and make a complete self-contained generator and starting unit for emergency light conditions, having a novel activator and indicator.

What I claim as new and desire to secure by Letters Patent in the United States is:

1. An electrolytic generator for a self-contained electric emergency lamp device wherein the lamp is permanently connected to a generator of electricity, which generator comprises inner and outer, positive and negative poles operating in an electrolyte when the generator is functioning, one of said poles serving as a casing for the generator, a frangible ball of vitreous material containing electrolytic fluid for activating the generator elements, a bulbous formation of ductile material normally extending from said casing and formed integral with one end thereof and conforming to the shape of the ball, the said frangible ball supported by the bulbous formation formed at one end of the casing, and a sack of absorbent material between said poles and encompassing both the inner pole and the said ball, to conduct the electrolytic fluid substantially instantaneously by capillarity to all parts of the poles after the ball is broken by deformation of the bulbous formation to bring the generator into operation and the device placed vertically, said bulbous formation serving as an indicator of the condition of the device.

2. An electrolytic generator for a self-contained electric emergency lamp device wherein the lamp is permanently connected to a generator of electricity, which generator comprises inner and outer, positive and negative poles operating in an electrolyte when the generator is functioning, one of said poles serving as a casing for the generator, a frangible ball of vitreous material containing electrolytic fluid for activating the generator elements, a bulbous formation of ductile material normally extending from said casing and formed integral with one end thereof and conforming to the shape of the ball, the said frangible ball supported by the bulbous formation formed at one end of the casing, and a sack of absorbent material surrounding said ball and extending upwardly between said poles to the opposite end of said casing, to conduct the electrolytic fluid substantially instantaneously by capillarity to the farthermost extent of said poles after the ball is broken by deformation of the bulbous formation to bring the generator into operation and the device placed vertically, said bulbous formation serving as an indicator of the condition of the device.

GUNNAR A. F. WINCKLER.